United States Patent
Lee

(10) Patent No.: US 7,227,609 B2
(45) Date of Patent: Jun. 5, 2007

(54) IN-PLANE SWITCHING MODE THIN FILM TRANSISTOR LIQUID CRYSTAL DISPLAY DEVICE WITH WIDE VIEWING ANGLE

(75) Inventor: Yun-Bok Lee, Seoul (KR)

(73) Assignee: LG.Philips LCD Co., Ltd, Youngdungapo-ku Seoul (KR)

( * ) Notice: Subject to any disclaimer, the term of this patent is extended or adjusted under 35 U.S.C. 154(b) by 27 days.

(21) Appl. No.: 10/695,908

(22) Filed: Oct. 30, 2003

(65) Prior Publication Data
US 2004/0090564 A1    May 13, 2004

Related U.S. Application Data

(63) Continuation of application No. 09/944,117, filed on Sep. 4, 2001, now Pat. No. 6,680,772.

(30) Foreign Application Priority Data
Sep. 14, 2000    (KR)    ............................ 2000-54081

(51) Int. Cl.
*G02F 1/1343*    (2006.01)
(52) U.S. Cl. ...................... 349/146; 349/145
(58) Field of Classification Search ........ 349/141–146
See application file for complete search history.

(56) References Cited

U.S. PATENT DOCUMENTS

| | | | | |
|---|---|---|---|---|
| 5,745,207 A | * | 4/1998 | Asada et al. ................ | 349/141 |
| 5,905,556 A | * | 5/1999 | Suzuki et al. ............... | 349/141 |
| 5,946,066 A | * | 8/1999 | Lee et al. ................... | 349/141 |
| 6,243,146 B1 | * | 6/2001 | Rho et al. .................... | 349/42 |
| 6,456,350 B1 | * | 9/2002 | Ashizawa et al. .......... | 349/141 |
| 2002/0008799 A1 | | 1/2002 | Ota et al. | |

FOREIGN PATENT DOCUMENTS

JP    2000-122065    4/2000

OTHER PUBLICATIONS

T. Suzuki et al., "Analysis and Control of Extraordinary Domains in Wide-Viewing-Angle In-Plane-Switching Mode TFT-LCDs." SID 97 DIGEST; p. 184-187.

* cited by examiner

*Primary Examiner*—David Nelms
*Assistant Examiner*—Richard H Kim
(74) *Attorney, Agent, or Firm*—McKenna Long & Aldridge LLP

(57) ABSTRACT

This disclosure provides an array substrate for use in an IPS-LCD device which includes substantially zigzag-shaped pixel and common electrodes. The pixel electrodes and the common electrodes are connected with a connecting line and the common line, respectively. However, if each pixel and common electrode forms an acute angle with each connecting and common lines, liquid crystal molecules are strangely rotated and produce extraordinary domains in the intersection when the voltage is turned ON. Moreover, disclination occurs around the intersection. In order to overcome these problems, substantially sawtooth-shaped bases are employed of where the pixel and common electrodes meet the connecting and common lines, respectively. So each electrode forms an obtuse angle with each respective line, and thus the rotational direction of the liquid crystal molecules are the same in regions of the pixel area when the voltage is supplied. Accordingly, disclination is prevented, and the aperture ratio and the response characteristic are improved.

26 Claims, 8 Drawing Sheets on state

IN-PLANE SWITCHING MODE THIN FILM TRANSISTOR LIQUID CRYSTAL DISPLAY DEVICE WITH WIDE VIEWING ANGLE

This application is a continuation of prior application Ser. No. 09/944,117, filed Sep. 4, 2001 now U.S. Pat. No. 6,680,772.

This application claims the benefit of Korean Patent Application No. 2000-54081, filed on Sep. 14, 2000, which is hereby incorporated by reference.

BACKGROUND OF THE INVENTION

1. Field of the Invention

The present invention relates to a liquid crystal display device, and more particularly to a liquid crystal display device implementing in-plane switching (IPS) where an electric field to be applied to liquid crystal molecules is generated in a plane parallel to a substrate.

2. Discussion of the Related Art

A liquid crystal display device uses the optical anisotropy and polarization properties of liquid crystal molecules to produce an image. Liquid crystal molecules have a definite orientational alignment as a result of their long, thin shapes. That orientational alignment can be controlled by an applied electric field. In other words, as an applied electric field changes, so does the alignment of the liquid crystal molecules. Due to the optical anisotropy, the refraction of incident light depends on the orientational alignment of the liquid crystal molecules. Thus, by properly controlling an applied electric field a desired light image can be produced.

While various types of liquid crystal display devices are known, active matrix LCDs having thin film transistors and pixel electrodes arranged in a matrix are probably the most common. This is because such active matrix LCDs can produce high quality images at reasonable cost.

Recently, liquid crystal display (LCD) devices with light, thin, and low power consumption characteristics are used in office automation equipment and video units and the like. Driving methods for such LCDs typically include a twisted nematic (TN) mode and a super twisted nematic (STN) mode. Although TN-LCDs and STN-LCDs have been put to practical use, they have a drawback in that they have a very narrow viewing angle. In order to solve the problem of narrow viewing angle, in-plane switching liquid crystal display (IPS-LCD) devices have been proposed. The IPS-LCD devices typically include a lower substrate where a pixel electrode and a common electrode are disposed, an upper substrate having no electrode, and liquid crystals interposed between the upper and lower substrates.

A detailed explanation about operation modes of a typical IPS-LCD panel will be provided referring to FIGS. 1 to 3.

As shown in FIG. 1, upper and lower substrates 1 and 2 are spaced apart from each other, and a liquid crystal layer 3 is interposed therebetween. The upper and lower substrates 1 and 2 are called color filter substrate and array substrate, respectively. Pixel and common electrodes 4 and 5 are disposed on the lower substrate 2. The pixel and common electrodes 4 and 5 are parallel with and spaced apart from each other. The pixel and common electrodes 4 and 5 apply a horizontal electric field 6 to the liquid crystal layer 3. The liquid crystal layer 3 has a negative or positive dielectric anisotropy, and thus it is aligned parallel with or perpendicular to the horizontal electric field 6, respectively.

FIGS. 2A and 2B conceptually illustrate operation modes of a conventional IPS-LCD device. When there is no electric field between the pixel and common electrodes 4 and 5, as shown in FIG. 2A, the long axes of the liquid crystal molecules maintain an angle from a line perpendicular to the parallel pixel and common electrodes 4 and 5. Herein, the angle is 45 degrees, for example.

On the contrary, when there is an electric field between the pixel and common electrodes 4 and 5, as shown FIG. 2B, there is an in-plane horizontal electric field 6 parallel with the surface of the lower substrate 2 between the pixel and common electrodes 4 and 5. The in-plane horizontal electric field 6 is parallel with the surface of the lower substrate 2 because the pixel and common electrodes 4 and 5 are formed on the lower substrate 2. Accordingly, the liquid crystal molecules are twisted so as to align, for example, the long axes thereof with the direction of the horizontal electric field 6, thereby the liquid crystal molecules are aligned such that the long axes thereof are parallel with the line perpendicular to the pixel and common electrodes 4 and 5.

By the above-mentioned operation modes and with additional parts such as polarizers and alignment layers, the IPS-LCD device displays images. The IPS-LCD device has wide viewing angles since the pixel and common electrodes are together placed on the lower substrate. Moreover, the fabricating processes of this IPS-LCD device are simpler than those of other various LCD devices.

However in the IPS-LCD device, a color-shift which depends on the viewing angle still remains. It is already known that this color-shift cannot be acceptable for full color-image display. This color-shift is related to a rotational direction of the liquid crystal molecules under application of electric field when the applied voltage is greater than the threshold voltage. Moreover, this color-shift is caused by increasing or decreasing of an optical retardation ($\Delta n \cdot d$) of the liquid crystal layer with viewing angle.

For the sake of discussing the above-mentioned problem of the IPS-LCD device, with reference to FIG. 3, the specific pixel structure of the IPS-LCD device is employed and will be described in detail.

As shown in FIG. 3, the pixel and common electrodes 7 and 8 have bend angle $\alpha$. These bend electrode's structure allows the liquid crystal molecules 9 to rotate in opposite direction in each pixel when the voltage is supplied to the bend electrodes. Therefore, the bend electrodes 7 and 8 and the oppositely directed liquid crystal molecules 9 divide the pixel into two different regions with different viewing angle characteristics. And thus, the color-shift can be effectively compensated by this multi domain structure.

However, when the voltage is turned ON, extraordinary domains appear around the bottom edges of driving electrodes. These extraordinary domains degrade the picture quality and reliability of the IPS-LCD device having the bend electrodes. Namely, disclination appears at the edges of the pixel areas, and thus this disclination manifests as positional non-uniformities in the transmittance of light.

FIGS. 4A and 4B are enlarged partial plan views of pixel and common electrodes. These figures illustrate arrangement of the liquid crystal molecules and the electric field when the voltage is turned ON. As shown, a common electrode 11 is extended from a common line 23, and a pixel electrode 21 is disposed parallel with the common electrode 11. The common electrode 11 forms an acute angle with the common line 23 as depicted in a portion "A" of FIG. 4A while the pixel electrode 21 forms an obtuse angle with the common line 23 as shown in a portion "D" of FIG. 4A. When the voltage is supplied to the common and pixel electrodes 11 and 21, the electric field occurs between the common and pixel electrodes 11 and 21. However at this time, a distortion of the electric field appears around the acute and obtuse angels, the portions "A" and "D". Thereupon, reverse rotational deformation is caused by this distortion of the electric field around the portions "A" and "D".

Referring to FIG. 4B, when the voltage is applied to the pair of electrodes 11 and 21, the liquid crystal molecule 41 located in the parallel electric field area turns clockwise while the liquid crystal molecule 51 located in the distorted electric field area turns counterclockwise. So the orientation direction of the liquid crystal is different between the parallel electric field area and the distorted electric field area, and thus the disclination occurs in the distorted electric field area. This disclination causes a decrease in the aperture ratio, and a change of the orientation direction causes traces of the extraordinary domains. These features also affect response characteristic of the liquid crystal layer, and an afterimage phenomenon occurs in the display area

SUMMARY OF THE INVENTION

Accordingly, the present invention is directed to an IPS-LCD device that substantially obviates one or more of the problems due to limitations and disadvantages of the related art.

An object of the present invention is to provide an array substrate for use in the IPS-LCD device having an increased aperture ratio.

Another object of the present invention is to provide the array substrate for use in the IPS-LCD device which suppresses the traces of extraordinary domains and afterimage phenomenon.

Another object of the present invention is to provide the array substrate for use in the IPS-LCD device which improves the response characteristics of the liquid crystal layer.

In order to achieve the above object, the first preferred embodiment of the present invention provides an array substrate for use in an in-plane switching liquid crystal display device including a plurality of gate lines on a substrate; a plurality of data lines over the substrate, each data line being perpendicular to each gate line; a common line on the substrate, the common line being parallel with and spaced apart from the gate line; a plurality of common electrodes extended from the common line and elongated along the data line, wherein each common electrode has a plurality of bend portions, and wherein each common electrode has a sawtooth-shaped base in contacting part where each common electrode meets the common line in order to form an obtuse angle with the common line; a plurality of pixel electrodes spaced apart from and elongated along the common electrodes, wherein each pixel electrode has a plurality of bend portions and corresponds to each common electrode; a connecting line contacting one end of each pixel electrode, the connecting line electrically connecting pixel electrodes; a switching element electrically connected with the gate and data lines, the switching element supplying voltage to the pixel electrodes.

Each pixel electrode has a sawtooth-shaped base in contacting part where each pixel electrode meets the connecting line, and makes an obtuse angle with the connecting line using the sawtooth-shaped base.

The connecting line overlaps a portion of each gate line and comprises a storage capacitor with each gate line. One of the common electrodes elongates along the data line and electrically communicates with adjacent pixels.

The common line crosses the one of bend portions of each common electrode, and electrically connects a plurality of common electrodes. Moreover, the common line elongates along the gate line and communicates with the other common lines that are located in the adjacent pixels.

The present invention also provides, in another aspect, an array substrate for use in an in-plane switching liquid crystal display device including a gate line on a substrate; a data line over the substrate, the data line being perpendicular to the gate line; a common line being parallel with and spaced apart from the gate line; a plurality of common electrodes extended from the common line, wherein each common electrode has a zigzag shape and a sawtooth-shaped base, and wherein each common line forms an angle of greater than 90° with the sawtooth-shaped base; a connecting line being parallel with the gate line; a plurality of pixel electrodes extended from the connecting line, wherein each pixel electrode has a zigzag shape and a sawtooth-shaped base, and wherein each common line forms an angle of greater than 90° with the sawtooth-shaped base; and a switching element electrically connected with the gate and data lines, the switching element supplying voltage to the pixel electrodes.

The aforementioned switching element is located in the crossing of the gate and data lines. This switching element includes a source electrode that is extended from the data line; a gate electrode that is extended from the gate line; a drain electrode that contacts one of the pixel electrodes through a drain contact hole; an active layer that is formed over the gate electrode and between the source and drain electrodes; and ohmic contact layers that are formed between the active layer and the source and drain electrodes.

One of the pixel electrodes has a bend end portion over the drain electrode. This bend end portion overlaps one end of the drain electrode and contacts the drain electrode through the drain contact hole The connecting line overlaps a portion of the gate line, and the connecting line and the gate line comprise a storage capacitor. A plurality of the pixel electrodes and the connecting line can be made of a transparent conductive material. However, a plurality of the pixel electrodes and the connecting line can be made of an opaque metallic material.

A plurality of the common electrodes and the common line can be made of a transparent conductive material. However, the plurality of the common electrodes and the common line can be made of an opaque metallic material.

The present invention also provides, in another aspect, an array substrate for use in an in-plane switching liquid crystal display device including a gate line on a substrate; a data line over the substrate, the data line being perpendicular to the gate line, wherein each pair of gate and data lines defines a pixel area; a common line being parallel with and spaced apart from the gate line, wherein the common line is located in any region of the pixel area and elongates along the gate line; a plurality of common electrodes extended from the common line, wherein each common electrode has a zigzag shape and sawtooth-shaped base in the intersection where each common electrode crosses the common line, wherein each common line forms an angle of greater than 90° with the sawtooth-shaped base, and wherein one of the common electrodes elongates along the data line; a connecting line being parallel with the gate line; a plurality of pixel electrodes extended from the connecting line, wherein each pixel electrode has a zigzag shape and a sawtooth-shaped base, and wherein each common line forms an angle of greater than 90° with the sawtooth-shaped base; and a switching element electrically connected with the gate and data lines, the switching element supplying voltage to the pixel electrodes.

One of the pixel electrodes has a sharply bent end portion over the switching element that is located in the crossing of the gate and data lines. This switching element includes a source electrode that is extended from the data line; a gate electrode that is extended from the gate line; a drain electrode that is the bent end portion of one pixel electrode; an active layer that is formed over the gate electrode and between the source and drain electrodes; and ohmic contact layers that are formed between the active layer and the source and drain electrodes.

The drain electrode and the pixel electrodes can be separately formed on a different layers. Moreover, a substance of which the drain electrode is made can be different from that of the pixel electrodes. However, the data line, the connecting line, the pixel electrodes, and the source and drain electrodes can be made of the same material.

The connecting line overlaps a portion of the gate line, and the connecting line and the gate line comprise a storage capacitor. And the common line and each common electrode intersect in one bend portion of each common electrode. Moreover, the common line is connected with the other common lines that are located in the adjacent pixel areas in order to form a mesh shape.

One of the common electrodes is connected with the other common electrodes that are positioned in the adjacent pixel areas in order to form the mesh shape.

A plurality of the pixel electrodes and the connecting line can be made of a transparent conductive material. However, the plurality of the pixel electrodes and the connecting line can be made of an opaque metallic material.

A plurality of the common electrodes and the common line are made of a transparent conductive material. However, the plurality of the common electrodes and the common line are made of an opaque metallic material.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings:

FIGS. 6A and 6B are enlarged plan views of a portion "B" of FIG. 5A when the voltage is turned ON;

DETAILED DESCRIPTION OF THE PREFERRED EMBODIMENTS

Reference will now be made in detail to the preferred embodiments of the present invention, examples of which are illustrated in the accompanying drawings.

Figure 1:
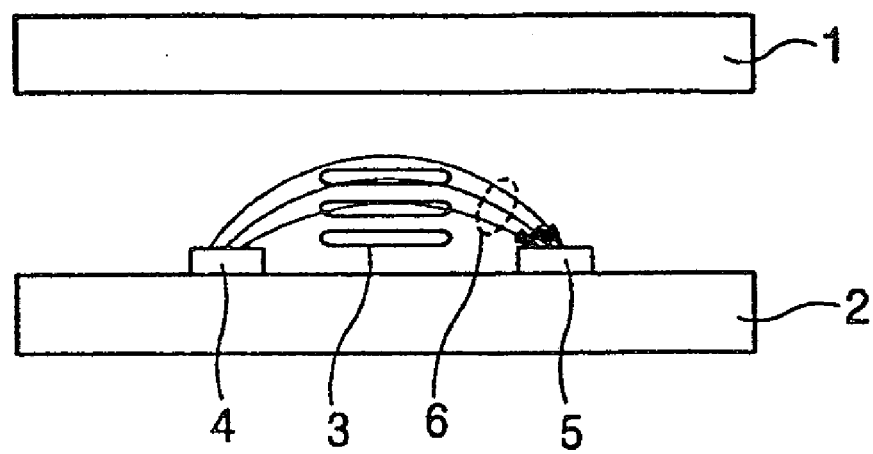
FIG. 1 is a conceptual cross sectional view illustrating a typical IPS-LCD panel.
Figure 2A:
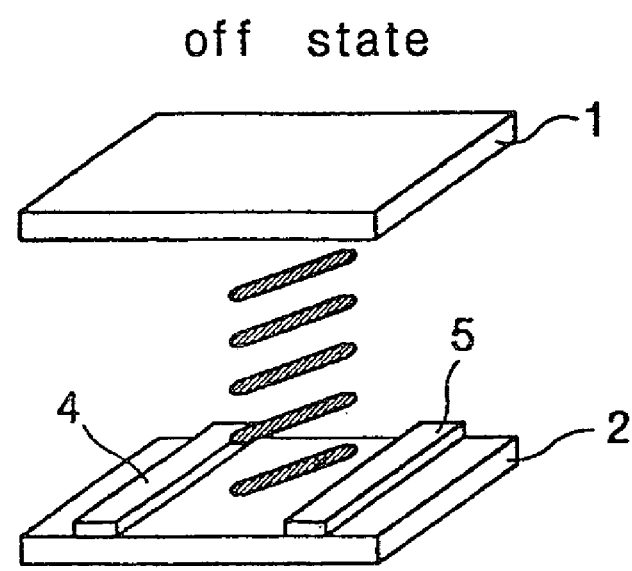
FIGS. 2A and 2B are conceptual perspective views illustrating operation modes of a conventional IPS-LCD device.
Figure 2B:
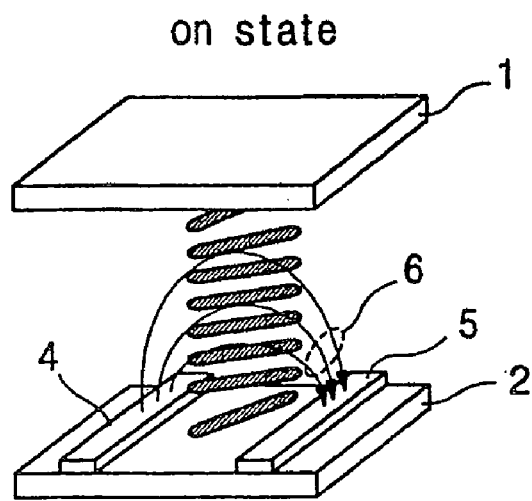
Figure 3:
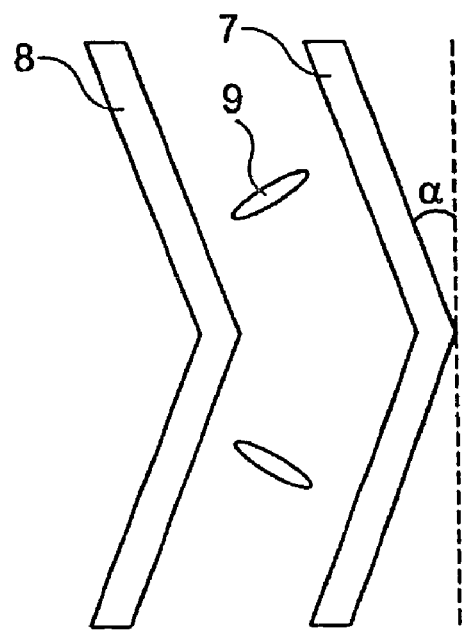
FIG. 3 is a partial plan view illustrating bend electrodes of the conventional IPS-LCD device.
Figure 4A:
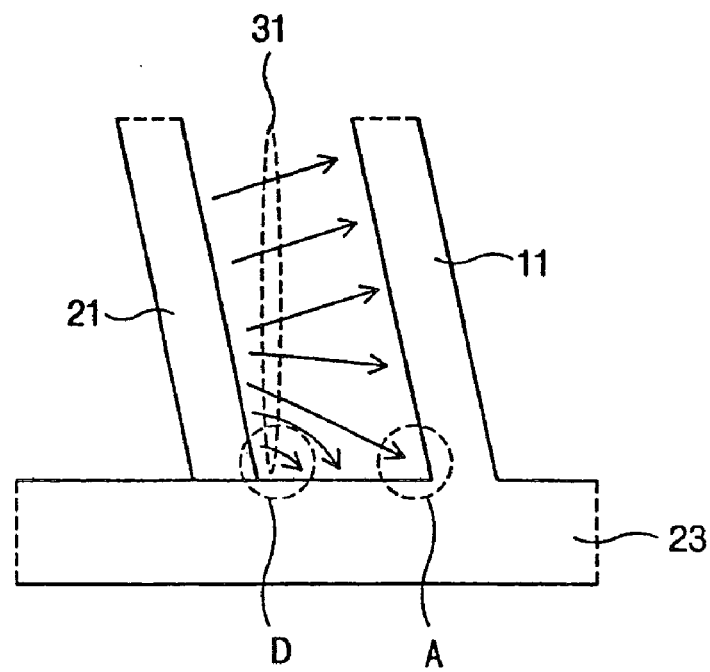
FIGS. 4A and 4B are enlarged partial plan views of pixel and common electrodes according to the conventional IPS-LCD device.
Figure 4B:
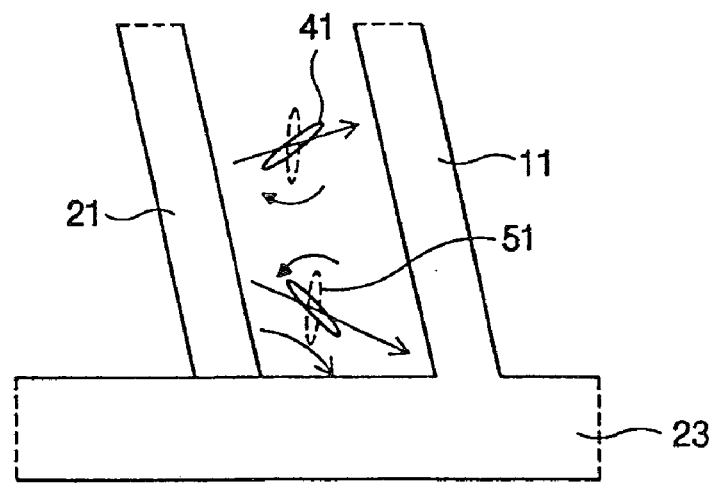
Figure 5A:
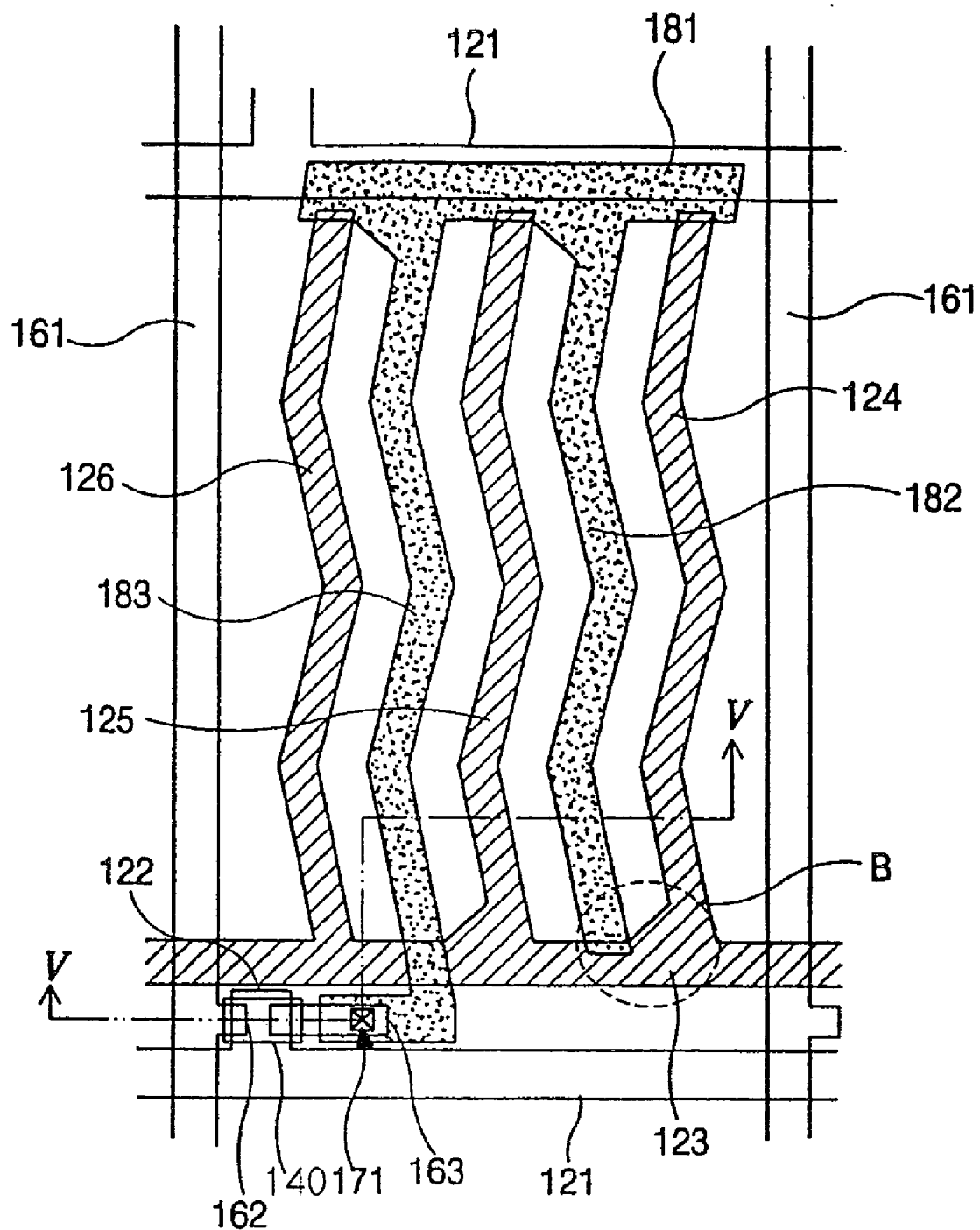
FIG. 5A is a plan view illustrating a pixel of an array substrate for use in an IPS-LCD device according to a first preferred embodiment of the present invention.
Figure 5B:
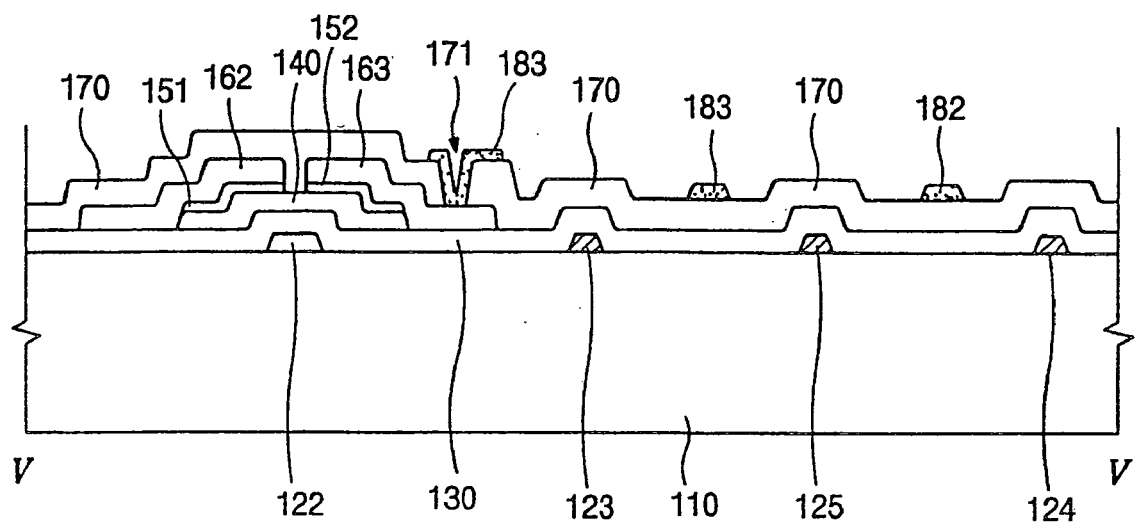
FIG. 5B is a cross-sectional view taken along line V-V of FIG. 5A.

FIG. 5A is a plan view illustrating a pixel of an array substrate for use in an IPS-LCD device according to a first preferred embodiment of the present invention, and FIG. 5B is a cross-sectional view taken along line V-V of FIG. 5A.

As shown in FIG. 5A, a plurality of gate lines 121 are transversely disposed on a substrate 110 (see FIG. 5B). A common line 123 is spaced apart from the gate lines 121 and disposed parallel with the gate lines 121. A plurality of data lines 161 that are spaced apart from each other are disposed across and perpendicular to the gate and the common lines 121 and 123. Each pair of gate and data lines 121 and 161 defines a pixel area.

Near the crossing of the gate and data lines 121 and 161, gate and source electrodes 122 and 162 are positioned and electrically connected with the gate and data lines 121 and 161, respectively. A drain electrode 163 is spaced apart from the source electrode 162 and overlaps one end of the gate electrode 122. The source electrode 162 overlaps the other end of the gate electrode 122. An active layer 140 is located over the gate electrode 122 and between the source and drain electrodes 162 and 163 and the gate electrode 122.

A connecting line 181 is disposed parallel with the gate line 121 and overlaps a portion of the gate line 121. And thus the connecting line 181 and the gate line 121 comprise a storage capacitor. First and second pixel electrodes 182 and 183, which extend from the connecting line 181, are disposed in substantially zigzag shapes roughly perpendicular to the connecting line 181, and thus the first and second pixel electrodes 182 and 183 communicate with the connecting line 181. One end of the second pixel electrode 183 bends over the drain electrode 163 and overlaps one end of the drain electrode 163. This end of the second pixel electrode 183 electrically contacts the drain electrode 163 through a drain contact hole 171.

First, second and third common electrodes 124, 125 and 126 that have substantially zigzag shapes are disposed parallel with the pixel electrodes 182 and 183. And one end of each common electrode 124, 125 or 126 is electrically connected to the common line 123. Each common electrode 124, 125 or 126 is spaced apart from the adjacent pixel electrodes 182 and 183. Although FIG. 5A shows three common electrodes and two pixel electrodes, the number of the common and pixel electrodes depends on a space between electrodes and on an angle of the bend portions of each electrode.

The common line 123, the gate and data lines 121 and 161, and the common electrodes 124, 125 and 126 are an opaque metal, while the pixel electrodes 182 and 183, and the connecting line 181 are a transparent conductive material. Preferably, the opaque metal is selected from a group consisting of chromium (Cr), aluminum (Al), aluminum alloy (Al alloy), molybdenum (Mo), tantalum (Ta), tungsten (W), and antimony (Sb), and the like, while the transparent conductive material is indium tin oxide (ITO) or indium zinc oxide (IZO). However, the common line 123 and the common electrodes 124, 125 and 126 can be a transparent conductive material. Although not depicted in FIG. 5A, the gate line 121, the gate electrode 122, the common line 123, and the common electrodes 124, 125 and 126 are covered by a gate insulation layer (see reference element 130 of FIG. 5) that is formed of silicon nitride (SiNx) or silicon oxide (SiO2).

Still referring to FIG. 5A, portions of the pixel electrodes 182 and 183 contact the connecting line 181 and portions of the common electrodes 124, 125 and 126 also contact the common line 123, and at least one of these portions has an obtuse angle between each line and each electrode. Such obtuse angle portions are shown, for example at the portion "B" of FIG. 6A, described by a dotted circle. Namely, each electrode makes the obtuse angle with each line by employing a sawtooth-shaped base of that driving electrode. That is, the pixel electrodes 182 and 183 intersect the connecting line 181 at an obtuse angle and the common electrodes 124, 125 and 126 intersect the common line 123 at an obtuse angle.

Although not depicted in FIG. 5A, the data line 161 can have a substantially zigzag shape as if the abovementioned pixel and common electrodes do.

Now referring to FIG. 5B, a fabricating process for the array substrate shown in FIG. 5A is provided. At first, the gate electrode 122 and the common electrodes 124 and 125 are formed on the substrate 110. The gate line 121 of FIG. 5A is formed with the gate electrode 121 in the same layer, and thus the gate electrode 122 extends from the gate line 121. If the gate electrode 122 and the common electrodes 124 and 125 are different materials, they are formed in different steps. Moreover, the common line 123 of FIG. 5A is formed with the common electrodes 124 and 125 in the same layer, and thus these common electrodes 124 and 125 that have substantially zigzag shapes extend from the common line 123. After that, a gate insulation layer 130 is formed on the substrate 110 to cover the gate electrode 122 and common electrodes 124 and 125. As mentioned before the gate insulation layer 130 is silicon nitride (SiNx) or silicon oxide (SiO2). Subsequently, an active layer 140 is formed on the gate insulation layer 130, particularly over the gate electrode 122. Ohmic contact layers 151 and 152 are formed on the active layer 140, and thus the ohmic contact layers 151 and 152 are interposed between the active layer 140 and the source and drain electrodes that are formed in a later step. The active layer 140 includes an amorphous silicon layer (a-Si), while the ohmic contact layers 151 and 152 include a doped amorphous silicon layer (n+a-Si).

The source and drain electrodes 162 and 163 are formed on the ohmic contact layers 151 and 152, respectively, and on the gate insulation layer 130. Those source and drain electrodes 162 and 163 are made of the same material as the gate electrode 122. At this time, the data line 161 is formed together with the source electrode 162 such that the data line 161 is connected to the source electrode 162. The source and drain electrodes 162 and 163 are spaced apart from each other and respectively overlap both ends of the gate electrode 122.

Thereafter, a passivation layer 170 is deposited over the entire surface of the substrate 110, and then patterned to form the drain contact hole 171 that exposes a portion of the drain electrode 163. The passivation layer 170 is made of silicon nitride (SiNx) or silicon oxide (SiO2). Next, the connecting line 181, which overlaps the portion of the gate line 121, is formed on the passivation layer 170. At this time, the first and second pixel electrodes 182 and 183 are simultaneously formed. And thus, one end of the second pixel electrode 183 contacts the drain electrode 163 through the drain contact hole 171. These pixel electrodes 182 and 183 have substantially zigzag shapes and are parallel with the common electrodes 124 and 125, as shown in FIG. 5A. Again, the pixel electrodes 182 and 183 are connected with the connecting line 181. Although the connecting lines 181 and the pixel electrodes 182 and 183 are made of the transparent conductive material, such as ITO and IZO, as described above, they can be made of an opaque conductive material.

Subsequently, although not shown in FIG. 5B, an orientation film of polyimide or photoalignment material is formed on the pixel electrodes and on the passivation layer, and rubbed by a fabric or patterned by light.

Figure 6A:
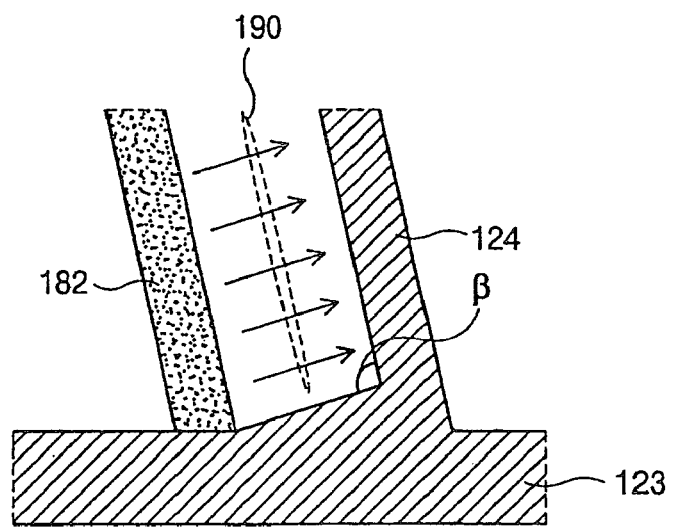
Figure 6B:
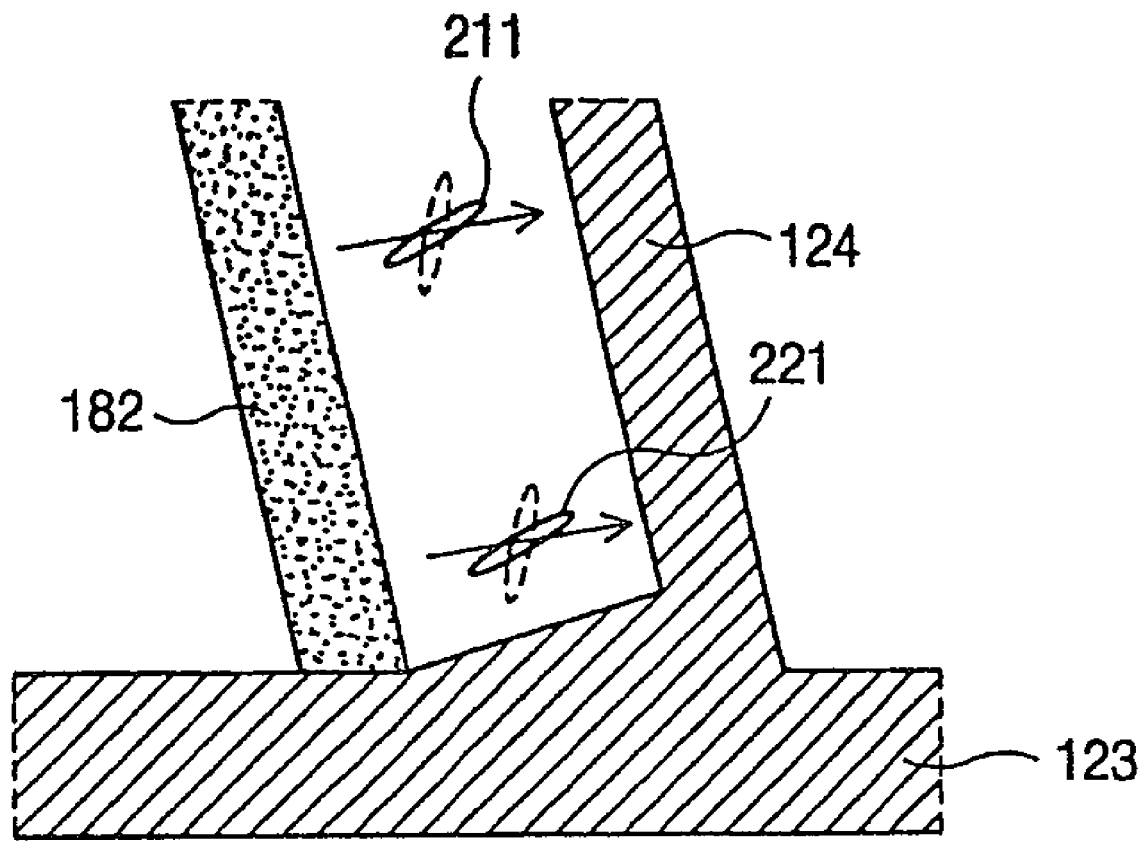

FIGS. 6A and 6B are enlarged plan views of a portion "B" of FIG. 5A when the voltage is turned ON. These figures illustrate the structure of the electrodes and common lines according to the first embodiment. As shown in FIGS. 6A and 6B, the common electrode 124 has a sawtooth-shaped base in a contacting part between the common electrode 124 and the common line 123. In other words, the common electrode 124 forms the angle of β, which is greater than 90°, with the sawtooth-shaped base that is a part of the common line 123. Accordingly, the common electrode 124 has an obtuse angle (i.e., the angle of β) with the common electrode 123. Here, when the voltage is applied to the common and pixel electrodes 124 and 182, electric field 190 is then perpendicular to the common and pixel electrodes 124 and 182. As shown FIG. 6B, not only liquid crystal molecules 211, which are relatively far from the common line 123, but also liquid crystal molecules 221, which are relatively close to the common line 123, turn clockwise, in contrast to the conventional art. Namely, the same rotational direction results in substantially the entire regions. Hence, the disclination does not appear, the traces of the extraordinary domains also do not appear, and the response characteristic of the liquid crystal layer is improved. Moreover, the afterimage phenomenon is not brought about in the display area.

Now, the reference will be explained in detail to a second preferred embodiment referring to FIGS. 7A to 8. According to the second embodiment, the common line also forms an obtuse angle with the common electrodes although these common line and common electrodes are formed in a mesh shape in order to decrease electrical resistance.

Figure 7A:
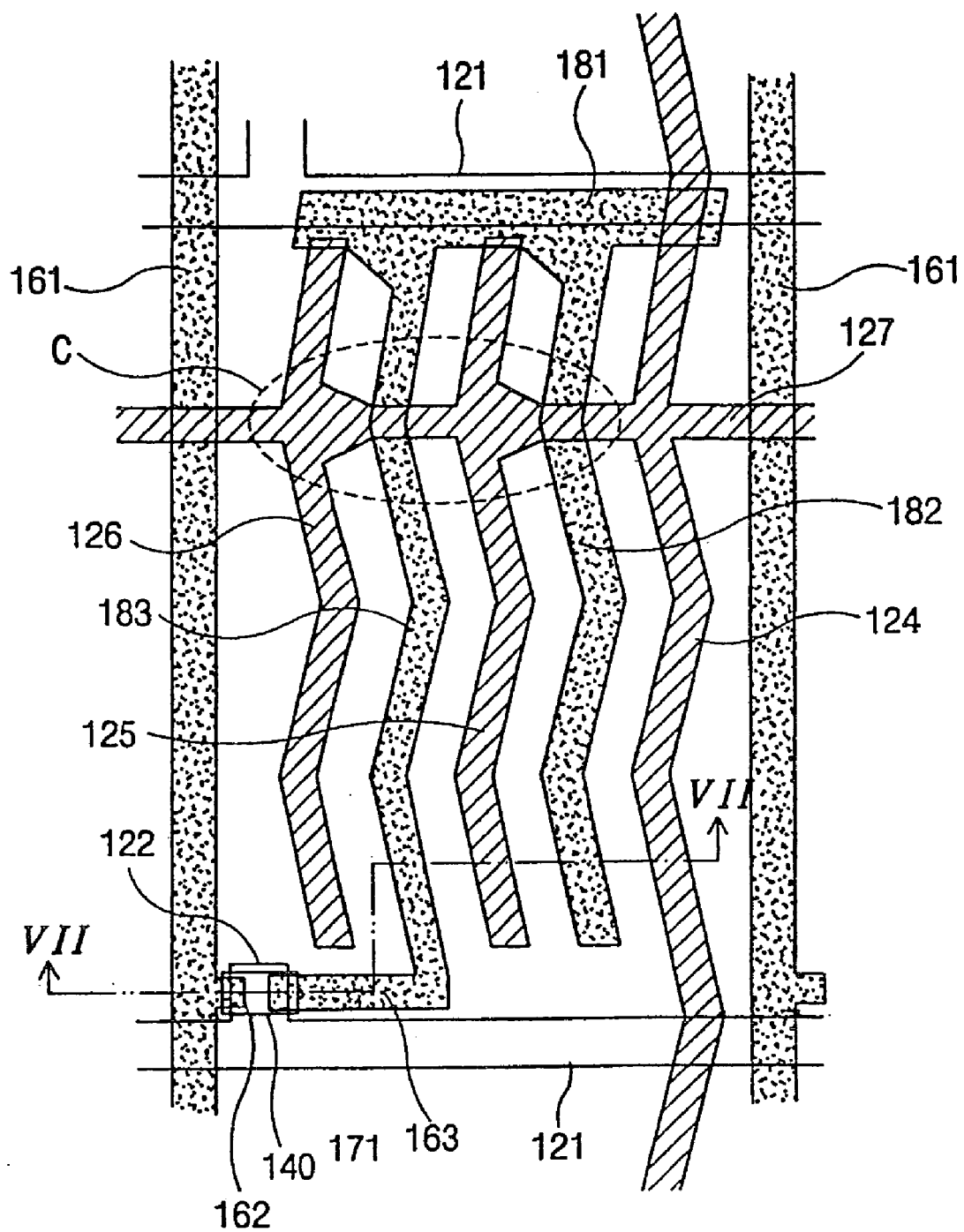
FIG. 7A is a plan view illustrating a pixel of an array substrate for use in an IPS-LCD device according to a second preferred embodiment.

FIG. 7A is a plan view illustrating a pixel of an array substrate for use in an IPS-LCD device according to the second preferred embodiment. As shown, a plurality of gate lines 121 are transversely disposed on a substrate 110 (see FIG. 7B). A plurality of data lines 161 that are spaced apart from each other are disposed across and perpendicular to the gate line 121. Each pair of gate and data lines 121 and 161 defines a pixel area.

Near the crossing of the gate and data lines 121 and 161, gate and source electrodes 122 and 162 are positioned and electrically connected with the gate and data lines 121 and 161, respectively. The source electrode 162 overlaps one end of the gate electrode 122. A connecting line 181 is disposed parallel with the gate line 121 and overlaps a portion of the gate line 121. And thus the connecting line 181 and the gate line 121 comprise a storage capacitor. First and second pixel electrodes 182 and 183, which are extended from the connecting line 181, are disposed in substantially zigzag shapes perpendicular to the connecting line 181, and thus the first and second pixel electrodes 182 and 183 communicate with the connecting line 181. One end of the second pixel electrode 183 bends over the gate electrode 122 and overlaps the other end of the gate electrode 122. This end of the second pixel electrode 183 is spaced apart from the source electrode 162 and acts as a drain electrode 163. However, the drain electrode 163 and the second pixel electrode 183 can be separately formed with different materials. When the drain electrode 163 is formed in a different fabricating step with different material, the pixel electrode can contact the drain electrode 163 through a drain contact hole (not shown). Moreover, an active layer 140 is located over the gate electrode 122 and between the source and drain electrodes 162 and 163.

A common line 127 is spaced apart from the gate lines 121 and transversely disposed parallel with the gate lines 121. The common line 127 can be located in any region of the pixel area, and this common line 127 extends to the next pixels areas and is transversely connected with the other adjacent common lines, which are positioned in the next pixel areas, in order to form a mesh shape with one of common electrodes 124.

Still referring to FIG. 7A, first, second and third common electrodes 124, 125 and 126 that have substantially zigzag shapes are disposed roughly parallel with the pixel electrodes 182 and 183, and extend from the common line 127. Again, each common electrode 124, 125 or 126 is electrically connected to the common line 127 in a respective bend portion of each common electrode. Each common electrode 124, 125 or 126 is spaced apart from the adjacent pixel electrodes 182 and 183. One of the common electrodes 124, 125 or 126, for example the first common electrode 124, extends along the data line 161 such that this common electrode is electrically connected to the other common electrodes that are located in adjacent upper and lower pixel areas. Thus, one of common electrodes 124 forms a mesh shape with the common line 127. Although FIG. 7A shows three common electrodes and two pixel electrodes, the number of the common and pixel electrodes depends on a space between electrodes and on an angle of the bend portions of each electrode.

In this second embodiment of the present invention, the common line 127, the gate and data lines 121 and 161, and the common electrodes 124, 125 and 126 can be an opaque metal. The pixel electrodes 182 and 183, and the connecting line 181 can be a transparent conductive material if they are formed separately from the drain electrode 163. Preferably, the opaque metal is selected from a group consisting of chromium (Cr), aluminum (Al), aluminum alloy (Al alloy), molybdenum (Mo), tantalum (Ta), tungsten (W), and antimony (Sb), and the like, while the transparent conductive material is indium tin oxide (ITO) or indium zinc oxide (IZO). However, the common line 127 and the common electrodes 124, 125 and 126 can be the transparent conductive material so as to provide a high aperture ratio. Although not depicted in FIG. 7A, the gate line 121, the gate electrode 122, the common line 127, and the common electrodes 124, 125 and 126 are covered up with a gate insulation layer (see reference element 130 of FIG. 5) that is formed of silicon nitride (SiNx) or silicon oxide (SiO2).

Still referring to FIG. 7A, portions at which the pixel electrodes 182 and 183 contact the connecting line 181 have obtuse angles between the connecting line 181 and each electrode 182 or 183, as described in the first embodiment. Further, the intersections in which the common electrodes 125 and 126 cross the common line 127 also have obtuse angles, i.e., the portion "C" which is described by a dotted ellipse. Namely, each common electrode 125 or 126 forms an obtuse angle with the common line 127 by employing sawtooth-shaped bases of those driving electrodes.

Although not depicted in FIG. 7A, the data line 161 can have a substantially zigzag shape as if the abovementioned pixel and common electrodes do.

Figure 7B:
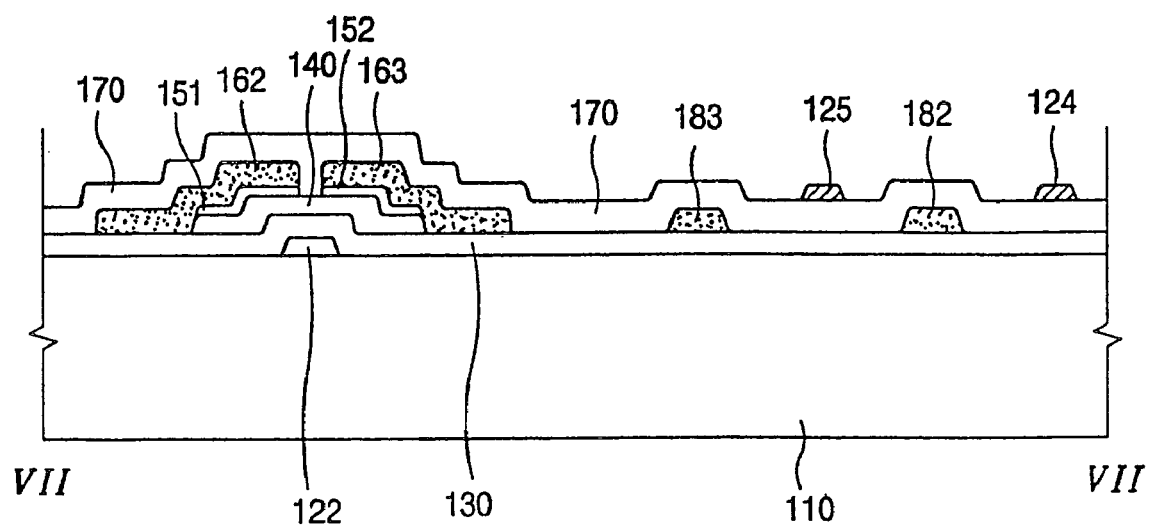
FIG. 7B is a cross-sectional view taken along line VII-VII of FIG. 7A.

FIG. 7B is a cross-sectional view taken along line VII-VII of FIG. 7A. As shown, a fabricating process for the array substrate shown in FIG. 7A is provided. At first, the gate electrode 122 and the gate line 121 of FIG. 7A are formed on the substrate 110 in the same layer. And thus, the gate electrode 122 extends from the gate line 121. After that, a gate insulation layer 130 is formed on the substrate 110 to cover the gate electrode 122 and the gate line 121 (see FIG. 7A). As mentioned before the gate insulation layer 130 is silicon nitride (SiNx) or silicon oxide (SiO2). Subsequently, an active layer 140 is formed on the gate insulation layer 130, particularly over the gate electrode 122. Ohmic contact layers 151 and 152 are formed on the active layer 140, and thus the ohmic contact layers 151 and 152 are interposed between the active layer 140 and the source and drain electrodes that are formed in a later step. The active layer 140 includes an amorphous silicon layer (a-Si), while the ohmic contact layers 151 and 152 include a doped amorphous silicon layer (n+a-Si).

Next, the source and drain electrodes 162 and 163 are formed on the ohmic contact layers 151 and 152, respectively, and on the gate insulation layer 130. Those source and drain electrodes 162 and 163 can be made of the same material as the gate electrode 122. The source and drain electrodes 162 and 163 are then spaced apart from each other and respectively overlap the gate electrode 122. At this time, the data line 161 is formed together with the source electrode 162 such that the data line 161 is connected to the source electrode 162. Moreover, the first and second pixel electrodes 182 and 183, which have substantially zigzag shapes, are formed on the gate insulation layer 130 when the source and drain electrodes 162 and 163 are formed. Thus, they can be made of the same materal. Simultaneously, the connecting line 181 is formed in the same layer such that the first and second pixel electrodes 182 and 183 contact the connecting line 181. The connecting line 181 on the gate insulation layer 130 overlaps a portion of the gate line 121, and thus these gate and connecting lines 121 and 181 comprise the storage capacitor, with the gate insulation layer 130 as a dielectric layer.

At this point, since the drain electrode 163 is one end of the second pixel electrode 183 as described before, the drain contact hole (not shown) is not required. However, in case that the drain electrode 163 is formed separately from the pixel electrode and made of the different material from the pixel electrode, the step of fabrication needs additional steps and a drain contact hole is also required through a passivation layer that is formed in a later step.

Thereafter, a passivation layer 170 is deposited over the entire surface of the substrate 110. The passivation layer 170 is made of silicon nitride (SiNx) or silicon oxide (SiO2). As shown in FIG. 7B, the drain contact hole is not depicted, contrary to the first embodiment. Next, the common electrodes 124 and 125, which have substantially zigzag shapes and are roughly parallel with the pixel electrodes 182 and 183, are formed on the passivation layer 130. Moreover, the common line 127 of FIG. 7A is formed with the common electrodes 124 and 125 in the same layer, and thus these common electrodes 124 and 125 extend from the common line 127. The common line 127 and the common electrodes 124 and 125 can be formed of the transparent conductive material, such as ITO and IZO, or an opaque conductive material.

Subsequently, although not shown in FIG. 7B, an orientation film of polyimide or photoalignment material is formed on the common electrodes and on the passivation layer, and rubbed by a fabric or patterned by light.

Figure 8:
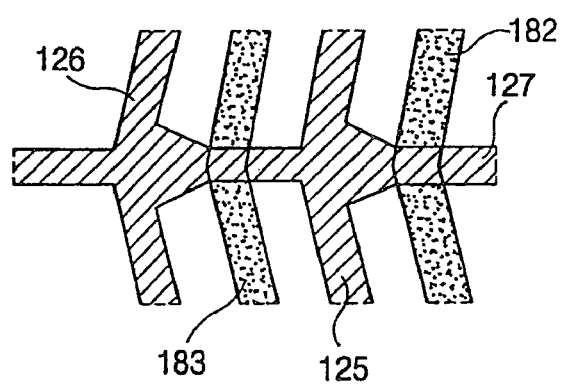
FIG. 8 is an enlarged plan view of a portion "C" of FIG. 7A.

FIG. 8 is an enlarged plan view of a portion "C" of FIG. 7A and illustrates the structure of the pixel electrodes and the common line according to the second embodiment. As shown, the common electrodes 125 and 126 have sawtooth-shaped bases at the intersections of the common electrodes 125 and 126 and the common line 127. In other words, the common electrodes 125 and 126 form obtuse angles, which are greater than 90°, with the sawtooth-shaped bases, which are part of the common line 127. Accordingly, as shown FIG. 6B, when the voltage is applied to the pixel and common electrodes, electric field is then perpendicular to the common and pixel electrodes. The rotational direction of the liquid crystal molecules should be the substantially same even regions near the intersection of the common electrodes 125 and 126 ad the common line 127.

Hence, as aforementioned, disclination does not appear in the intersection of the common electrodes and the common lines, traces of the extraordinary domains also do not appear, and the response characteristic of the liquid crystal layer is improved. Moreover, afterimage phenomenon is not brought about in the display area.

Further, preferred embodiments of the present invention include the following advantages.

First, since the in-plane switching liquid crystal display device (IPS-LCD) includes the substantially zigzag-shaped pixel and common electrodes, the IPS-LCD can have the wide viewing angle and can compensate color-shift.

Second, since the pixel and common electrodes form obtuse angles with the connecting and common lines, the same rotational direction of the liquid crystal molecules under application of electric field, when the applied voltage is applied, should result near the intersection of the pixel electrodes and the connecting line and near the intersection of the common electrodes and the common line. Therefore, disclination does not occur, traces of the extraordinary domains also do not appear, and the response characteristic of the liquid crystal layer is improved. Moreover, the afterimage phenomenon is not brought about in the display area.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
    a substrate;
    a plurality of gate lines on the substrate;
    a plurality of data lines crossing the gate lines on the substrate to define a pixel region, the data lines having a substantially zigzag shape;
    a common line substantially parallel to the gate line on the substrate;
    a plurality of common electrodes connected to the common line, the common electrodes having a substantially zigzag shape, and having an obtuse angle with the common line at both sides of the common electrodes where each of the common electrodes connects to the common line;
    a plurality of pixel electrodes substantially parallel to the common electrodes, the pixel electrodes having a substantially zigzag shape; and
    a switching element electrically connected to the gate and data lines,
    wherein liquid crystal molecules in a portion of a domain near the both sides of the common electrodes where each of the common electrodes connects to the common line and the common line between corresponding common electrodes and pixel electrodes have substantially a same rotational direction as liquid crystal molecules in a remaining portion of the domain.

2. The device according to claim 1, further comprising a connecting line electrically connected to the pixel electrodes.

3. The device substrate according to claim 2, wherein a plurality of the pixel electrodes and the connecting line are formed of an opaque metallic material.

4. The device according to claim 2, wherein the pixel electrodes form an obtuse angle with the connecting line.

5. The device according to claim 4, wherein the pixel electrodes have an angle between about 90° and about 180° with the connecting line.

6. The device according to claim 2, wherein the connecting line overlaps a portion of the gate line.

7. The device according to claim 6, wherein the connecting line and the gate line form a storage capacitor.

8. The device according to claim 1, wherein one of the common electrodes elongates in a direction along the data line and crosses the gate lines, wherein the elongated common electrode electrically communicates with adjacent pixel regions.

9. The device according to claim 1, wherein the common line crosses one of the bent portions of each common electrode.

10. The device according to claim 9, wherein the common line elongates along the gate line.

11. The device according to claim 1, wherein the switching element is formed at a crossing portion of the gate and the data lines.

12. The device according to claim 1, wherein the switching element includes a gate electrode, a gate insulator, a semiconductor layer, a source electrode, and a drain electrode.

13. The device according to claim 12, wherein one of the pixel electrodes has a bent end portion over the drain electrode.

14. The device according to claim 13, wherein the bent end portion overlaps a portion of the drain electrode and contacts the drain electrode through the drain contact hole.

15. The device substrate according to claim 1, wherein a plurality of the pixel electrodes and the connecting line are formed of a transparent conductive material.

16. The device according to claim 1, wherein a plurality of the common electrodes and the common line are formed of a transparent conductive material.

17. The device according to claim 1, wherein a plurality of the common electrodes and the common line are formed of an opaque metallic material.

18. The device according to claim 1, wherein the common line is connected with other common lines in adjacent pixel regions.

19. The device according to claim 1, wherein the common electrodes have an angle between about 90° and about 180° with the common line.

20. A method for fabricating a liquid crystal display device, comprising:

forming a plurality of gate lines on a substrate;

forming a plurality of data lines crossing the gate lines on the substrate to define a pixel region, the data lines having a substantially zigzag shape;

forming a common line substantially parallel to the gate lines on the substrate;

forming a plurality of common electrodes connected to the common line, the common electrodes having a substantially zigzag shape, and having an obtuse angle with the common line at both sides of the common electrodes where each common electrode connects to the common line;

forming a plurality of pixel electrodes substantially parallel to the common electrodes, the pixel electrodes having a substantially zigzag shape;

forming a switching element electrically connected to the gate and data lines; and providing liquid crystal molecules in a domain between the common and pixel electrodes, wherein the liquid crystal molecules in a portion of the domain near the the both sides of the common electrodes where each of the common electrodes connects to the common line and the common line have substantially a same rotational direction as liquid crystal molecules in a remaining portion of the domain.

21. The method according to claim 20, further comprising forming a connecting line electrically connected to the pixel electrodes.

22. The method according to claim 21, wherein the pixel electrodes form an obtuse angle with the connecting line.

23. The method according to claim 22, wherein the pixel electrodes have an angle between about 90° and about 180° with the connecting line.

24. The method according to claim 21, wherein the connecting line overlaps a portion of the gate line.

25. The method according to claim 24, wherein the connecting line and the gate line form a storage capacitor.

26. The method according to claim 20, wherein the common electrodes have an angle between about 90° and about 180° with the common line.

* * * * *